(12) United States Patent
Park

(10) Patent No.: US 9,629,311 B2
(45) Date of Patent: Apr. 25, 2017

(54) AUTOMATIC INJECTION SYRINGE FOR PLANTS

(71) Applicant: Hyun Jun Park, Seoul (KR)

(72) Inventor: Hyun Jun Park, Seoul (KR)

( * ) Notice: Subject to any disclaimer, the term of this patent is extended or adjusted under 35 U.S.C. 154(b) by 229 days.

(21) Appl. No.: 14/684,384

(22) Filed: Apr. 12, 2015

(65) Prior Publication Data

US 2015/0305253 A1 Oct. 29, 2015

(30) Foreign Application Priority Data

Apr. 23, 2014 (KR) .................. 10-2014-0048565

(51) Int. Cl.
*A01G 7/06* (2006.01)

(52) U.S. Cl.
CPC ..................... *A01G 7/06* (2013.01)

(58) Field of Classification Search
CPC ....... A01G 7/06; A01G 29/00; A01M 21/043; B27K 3/06
USPC ........................................................ 47/57.5
See application file for complete search history.

(56) References Cited

U.S. PATENT DOCUMENTS

| 4,596,088 | A | * | 6/1986 | Graber | ............ | A01G 7/06 47/57.5 |
| 6,789,354 | B2 | | 9/2004 | Wells | | |
| 7,114,289 | B2 | * | 10/2006 | Black | ............ | A01C 23/04 47/57.5 |
| 2004/0255512 | A1 | * | 12/2004 | Burgess | ............ | A01G 7/06 47/57.5 |
| 2005/0223637 | A1 | * | 10/2005 | Black | ............ | A01C 23/04 47/57.5 |

FOREIGN PATENT DOCUMENTS

| KR | 20-0160145 | 11/1999 |
| KR | 20-049384 | 10/2006 |

* cited by examiner

*Primary Examiner* — Monica Williams

(57) ABSTRACT

The present invention relates to an automatic injection syringe for plants, and in one aspect, the present invention provides an automatic injection syringe for plants, including: a main body which stores therein an injection solution; a needle which is inserted into a plant body and configured to allow the injection solution in the main body to flow out to the outside; an injection unit which is disposed in the main body and defines a storage space for storing the injection solution; an elastic member which is configured to move the injection unit inside the main body toward the needle when the elastic member is released from a compressed state; and a releasing unit which releases the elastic member from the compressed state.

10 Claims, 5 Drawing Sheets

AUTOMATIC INJECTION SYRINGE FOR PLANTS

CROSS REFERENCE TO RELATED APPLICATION

This application claims the benefit of priority of Korean Patent Application No. 10-2014-0048565 filed on Apr. 23, 2014, the contents of which are incorporated herein by reference in their entirety.

TECHNICAL FIELD

The present invention relates to an automatic injection syringe for plants.

BACKGROUND ART

In general, liquid type nutrients (or medicines) for plants are accommodated in a container, which has an end portion that is pointy and closed, and then distributed and stored. In addition, by cutting the closed end portion and sticking the container into the vicinity of a root of a plant, a solution accommodated in the container is injected into the plant for a predetermined time.

Ingredients of the nutrients (or medicines) include a special active agent (Fe, an amino acid, a nucleic acid) based on vitamin B-complex, or a special active agent (Mg, Fe, Mn, B, Na, Cu, and other microelements) in which nitrogen, phosphoric acid, and potassium are appropriately mixed. In addition, the nutrient may be injected into the plant for about one to two weeks by sticking the container into the vicinity of the root of the plant. The nutrients (or medicines) may be injected into the plant when the plant is wilting, before and after flowers bloom, when daylight is insufficient, when the plant is vulnerable to heat and cold, when improving health of the root, when enhancing green color of leaves, when preventing damage by disease and insects, and when supplying nutrition.

The container for nutrients (or medicines) for plants in the related art is a gravity type container, and is formed in a bottle shape by using flexible synthetic resin or glass as a main material. In addition, the interior of the container is filled with a liquid type nutrient (or medicine), and an end portion of the container is closed. In addition, while in use, the nutrient is injected into the plant by cutting the closed end portion, reversing the container, and sticking the container into the vicinity of the root of the plant. That is, the container has been used to supply nutrition through the root of the plant.

However, in this case, pressure in the container is constant or gradually decreased. Therefore, in order to inject the nutrient, the container needs to be necessarily stuck into a portion that is excellent in soil breathability. However, there is a problem in that in the case of a plant, such as a tree or a thick bonsai and a raised tree, which has a diameter of 5 cm or more, the nutrient cannot be injected directly to vessels through sieve tubes.

Further, there is a problem in that nutrition supplied to roots and leaves and treatment of roots and leaves depend on a fast-acting property.

In order to solve the aforementioned problems, U.S. Pat. No. 6,789,354 (Dispensing Capsule for Injecting Plants with Pesticides and Nutrients) and Korean Utility Model Registration No. 20-0160145 (Container for Trunk Injection Solution for Plants) disclose a pressure type device which is used to inject an injection solution directly into a plant body.

However, in the case of the pressure type device, there is a problem in that a user needs to manually push the container all the time in order to produce compressed air.

SUMMARY OF THE INVENTION

The present invention has been made in an effort to provide an automatic injection syringe for plants, which is capable of automatically injecting an injection solution into a plant.

Technical problems to be achieved in the present invention are not limited to the aforementioned technical problem.

An exemplary embodiment of the present invention provides an automatic injection syringe for plants, including: a needle which is inserted into a plant body; a lid to which the needle is coupled; a main body which is coupled to the lid and accommodates therein an injection solution; an injection unit which is fixed in the main body or configured to be movable in the main body; an elastic member which is provided between the injection unit and the main body so as to push the injection unit toward the needle; and a releasing unit which releases the injection unit and the main body from the fixed state so that the injection unit is movable in the main body.

In addition, the injection unit may include: an injection member which pushes the injection solution in the main body so as to discharge the injection solution toward the needle; and a fixing member which is coupled to the injection member and fixed to the main body.

In addition, the elastic member may be disposed between the fixing member and the main body, and when the releasing unit is moved toward the needle in a state in which the fixing member is fixed to the main body, the fixing member and the main body may be released from the fixed state.

In addition, the elastic member may be maintained in a compressed state in a state in which the fixing member is fixed to the main body, and when the fixing member is released from the main body so as to be movable in the main body, the elastic member may push the fixing member toward the needle.

In addition, a fixing hole may be provided in the main body, and a hook, which separably engages with the fixing hole, may be provided on the fixing member.

In addition, the releasing unit may be disposed in the fixing hole, and the releasing unit may be configured to allow the hook to be pulled out from the fixing hole when the releasing unit is moved toward the needle.

In addition, a mounting groove into which the elastic member is inserted may be provided in the main body.

In addition, the lid may include a blocking film for blocking an outflow of the injection solution in the main body.

In addition, the needle may be configured to open the blocking film when the needle is coupled to the lid.

In addition, the main body and the lid may be separably coupled to each other.

The main body and the lid may be in threaded engagement with each other.

In addition, a fixing groove may be formed in one surface of an outer circumferential surface of the main body and an inner circumferential surface of the lid, and a fixing projection, which is coupled to the fixing groove, may be formed on the other surface.

In addition, the automatic injection syringe for plants may further include a sealing member which is provided between the main body and the lid.

In addition, the automatic injection syringe for plants may further include a wire which is connected with the injection unit. Here, the wire may be configured to penetrate the releasing unit and come out to the outside of the main body.

In addition, one or more projections may be provided on the needle.

Another exemplary embodiment of the present invention provides an automatic injection syringe for plants, including: a main body which stores therein an injection solution; a needle which is inserted into a plant body and configured to allow the injection solution in the main body to flow out to the outside; an injection unit which is disposed in the main body and defines a storage space for storing the injection solution; an elastic member which is configured to move the injection unit inside the main body toward the needle when the elastic member is released from a compressed state; and a releasing unit which releases the elastic member from the compressed state.

In addition, the releasing unit may be configured to be exposed to the outside of the main body.

Yet another exemplary embodiment of the present invention provides an automatic injection syringe for plants, including: a main body which stores therein an injection solution; an injection unit which defines a storage space for storing the injection solution in the main body, and is fixed in the main body or configured to be movable in the main body; an elastic member which is configured to move the injection unit inside the main body toward the needle when the elastic member is released from a compressed state; and a releasing unit which releases the injection unit and the main body from the fixed state so that the injection unit is movable in the main body.

The automatic injection syringe for plants associated with the exemplary embodiment of the present invention as described above has the following effects.

The elastic member is provided between the injection unit and the main body. In this case, the elastic member pushes the injection unit and discharges the injection solution stored in the main body. Therefore, the injection solution may be automatically injected into the plant. Furthermore, it is possible to reduce labor required to inject the injection solution, and the automatic injection syringe for plants may be reused.

DETAILED DESCRIPTION

Figure 1:
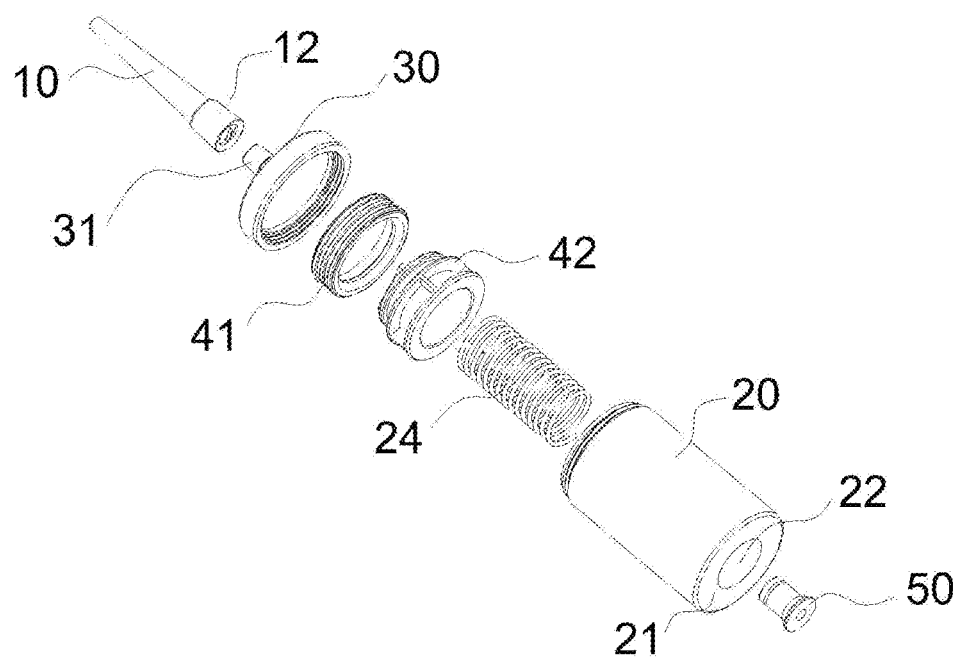
FIG. 1 is an exploded perspective view illustrating an automatic injection syringe for plants according to an exemplary embodiment of the present invention.

An automatic injection syringe for plants associated with an exemplary embodiment of the present invention includes a main body 20, an injection unit 40, an elastic member 24, and a releasing unit 50.

In addition, the automatic injection syringe for plants associated with the exemplary embodiment of the present invention may include a needle 10, a lid 30, the main body 20, the injection unit 40, the elastic member 24, and the releasing unit 50.

Referring to FIGS. 1 to 3B, the needle 10 includes a first end (for example, a distal end) which is inserted into a plant body, and a second end (for example, a proximal end) which is opposite to the first end, and coupled to the lid 30. In addition, a coupling portion 12 may be formed at the second end of the needle 10. The needle 10 may be coupled to the lid 30 by means of the coupling portion 12. The needle 10 is configured to be inserted into a plant body and allow an injection solution in the main body 20 to flow to the outside. The needle 10 may penetrate and be inserted into the plant body by means of a projection 11, whereby the injection solution may be easily discharged to the outside. In addition, the first end of the needle 10 may be formed by being cut at a predetermined angle. Therefore, the needle 10 may penetrate and be inserted into the plant body.

The lid 30 is coupled to the needle 10.

The main body 20 is coupled to the lid 30, and configured to store the injection solution therein. In addition, the main body 20 is coupled to the lid 30 by means of a coupling portion 60. In addition, the injection unit 40 is configured to be fixed in the main body 20, or to be movable in the main body 20. The injection unit 40 is disposed in the main body 20, and defines a storage space for storing the injection solution. As an example, in a state in which the lid 30 and the main body 20 are coupled to each other, the lid 30 and the injection unit 40 may define the storage space for storing the injection solution. The injection unit 40 serves to push and discharge the injection solution to the outside of the main body 20. The elastic member 24 is provided between the injection unit 40 and the main body 20 so as to push the injection unit 40 toward the needle 10. As an example, the elastic member 24 may be a spring, and the elastic member 24 may be a coil spring. In particular, the elastic member 24 may be configured to move the injection unit 40 inside the main body 20 toward the needle 10 when the elastic member 24 is released from a compressed state.

The releasing unit 50 is configured to release a fixed state between the injection unit 40 and the main body 20 so that the injection unit 40 may be moved in the main body 20. In addition, the releasing unit 50 may be configured to release the elastic member 24 from the compressed state. The releasing unit 50 may be configured to allow the injection unit 20 to push the injection solution in the main body 20 so that the injection solution flows toward the needle 10.

Figure 2:
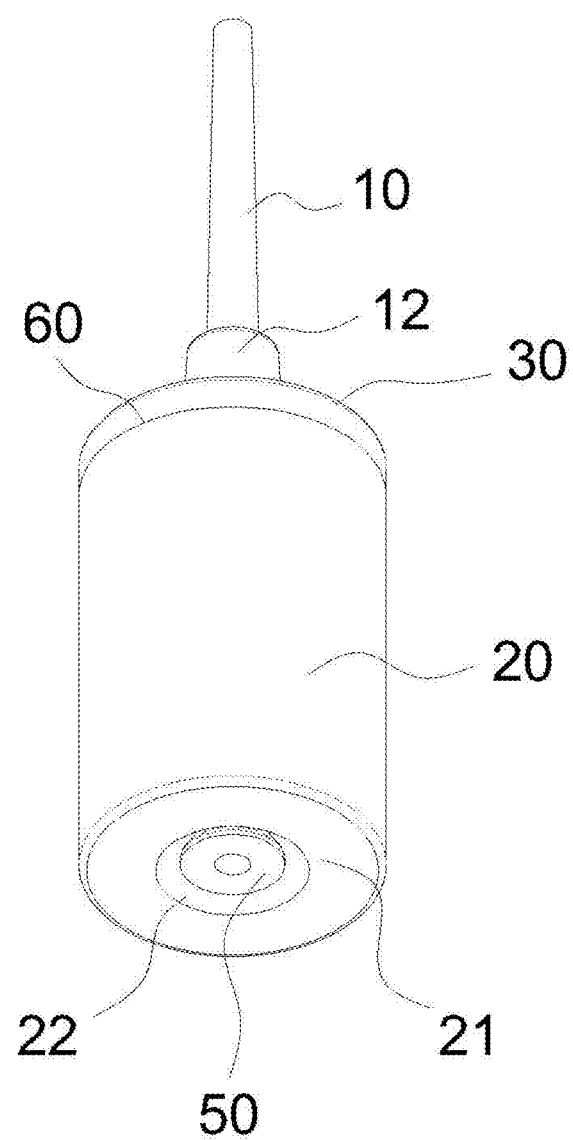
FIG. 2 is a perspective view illustrating a state in which the respective constituent elements illustrated in FIG. 1 are coupled.

Referring to FIGS. 1 and 2, the needle 10 may be formed in a conical tube shape having a predetermined length. Here, the first end of the needle 10 may be inserted into the plant body. Here, the needle 10 may have one or more projections 11. In particular, the projection 11 may be formed at the first end. In addition, the coupling portion 12 may be provided at the second end of the needle 10. Here, the coupling portion 12 may have a 'U' shape in cross section at both sides of a hollow space through which the injection solution is discharged.

Specifically, the needle 10 may be configured so that the hollow space through which the injection solution flows penetrates a center of the needle 10. In addition, the coupling portion 12 of the needle 10 is coupled to a protruding coupling portion 31 of the lid 30, such that the needle 10 may be coupled to the lid 30.

Meanwhile, the lid 30 and the main body 20 may be connected with each other by means of the coupling portion 60. In addition, the main body 20 and the lid 30 may be separably coupled to each other. For example, the main body 20 and the lid 30 may be in threaded engagement with each other. Alternatively, a fixing groove 25 may be formed in one surface of an outer circumferential surface of the main body 20 and an inner circumferential surface of the lid 30, and a fixing projection 32, which is coupled to the fixing groove 25, may be formed on the other surface.

The injection solution in the main body 20 may flow toward the needle 10 through the lid 30. Specifically, the injection solution, which is stored in a container to which the lid 30 and the main body 20 are coupled, may be discharged to the needle 10.

Figure 3A:
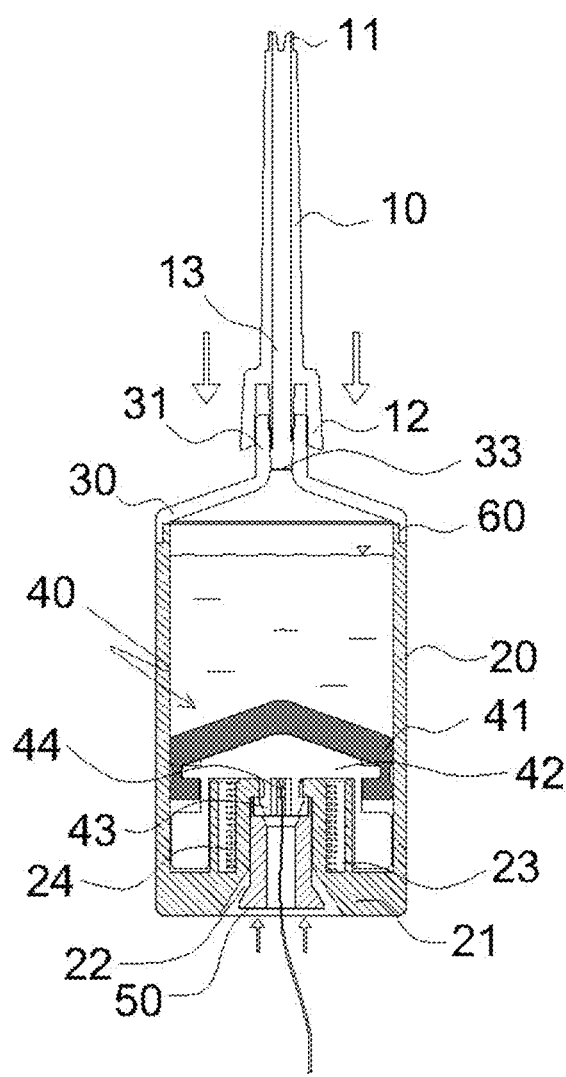
FIGS. 3A and 3B are cross-sectional views for explaining one operating state of the automatic injection syringe for plants according to the present invention.
Figure 3B:
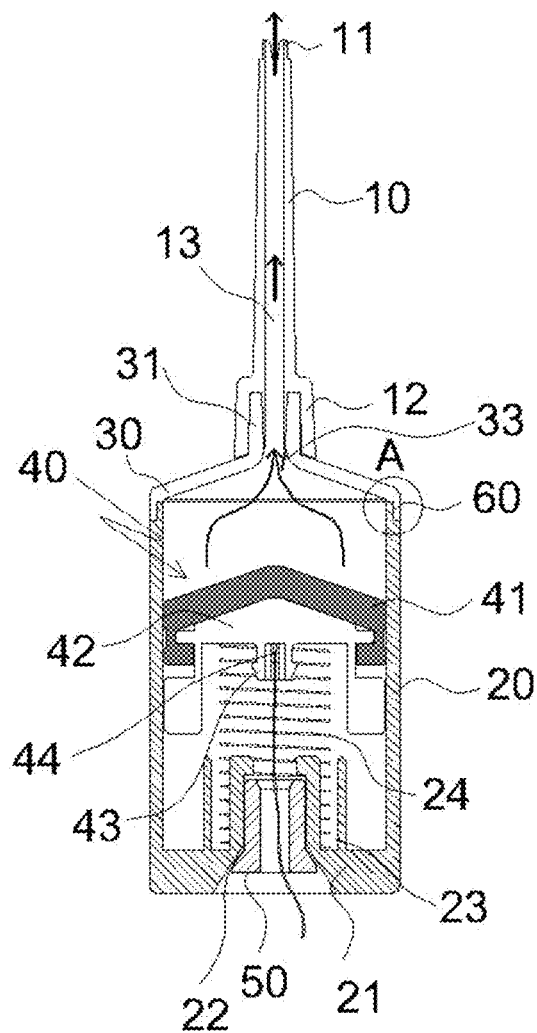

Referring to FIGS. 3A and 3B, the lid 30 may include a blocking film 33 which blocks an outflow of the injection solution in the main body 20. In addition, the needle 10 may be configured to open the blocking film 33 when the needle 10 is coupled to the lid 30. Specifically, the blocking film 33 may be formed in the protruding coupling portion 31. The blocking film 33 is configured to serve to block the outflow of the injection solution stored in the main body 20. Here, when the coupling portion 12 of the needle 10 is coupled to the protruding coupling portion 31, a partial region (for example, an inner wall surface) of the coupling portion 12 is inserted into the protruding coupling portion 31, thereby removing the blocking film 33. Therefore, the injection solution stored in the main body 20 may be discharged to the outside through the needle 10.

The storage space, which stores the injection solution, is formed in the main body 20. The main body 20 may be a cylinder that extends in a longitudinal direction of the main body 20. For ease of description, a portion of the main body 20, which is adjacent to the needle 10, may be referred to as an upper end portion of the main body 20. The main body 20 may have a bottom surface 21. In addition, the main body 20 may have a mounting groove 23 into which the elastic member 24 is inserted. In particular, the mounting groove 23 may be provided in the bottom surface 21 of the main body 20. The elastic member 24 may be inserted into and disposed in the mounting groove 23, and the position of the elastic member 24 may be maintained and fixed by the mounting groove 23.

In addition, a fixing hole 22 is formed in the bottom surface 21 of the main body 20. Specifically, the injection unit 40 may include an injection member 41 which pushes the injection solution in the main body 20 so that the injection solution is discharged toward the needle 10, and a fixing member 42 which is coupled to the injection member 41 and fixed to the main body 20. In addition, the fixing hole 22 is provided in the main body 20, and a hook 43, which separably engages with the fixing hole 22, may be provided on the fixing member 42. In addition, the releasing unit 50 is disposed in the fixing hole 22, and the releasing unit 50 may be configured to allow the hook 43 to be pulled out from the fixing hole 22 when the releasing unit 50 is moved toward the needle 10 by external force.

The injection unit 40 is provided in the main body 20. In addition, the injection unit 40 may be disposed in proximity to the bottom surface 21 of the main body 20. The fixing member 42 is disposed between the injection member 41 and the bottom surface 21 of the main body 20.

Meanwhile, when the injection unit 40 and the lid 30 are separated, the injection solution may be stored in the main body 20. Thereafter, the lid 30 may tightly close the main body 20 by means of the coupling portion 60.

Figure 4A:
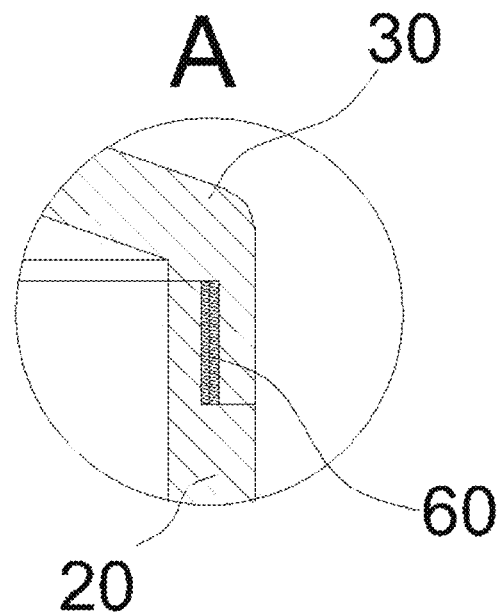
FIGS. 4A and 4B are enlarged views of part A of FIG. 3B.
Figure 4B:
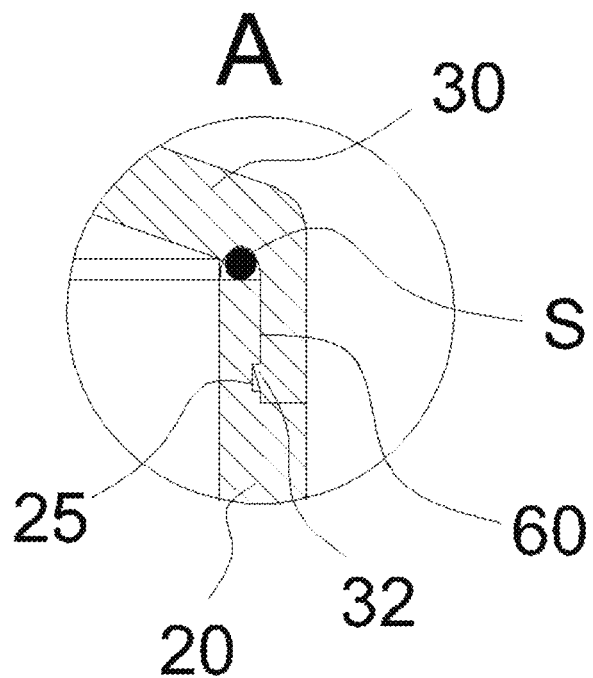

Referring to FIGS. 4A and 4B, the coupling portion 60 of the main body 20 and the lid 30 may be in threaded engagement with each other, or may be coupled to each other by means of the fixing groove 25 and the fixing projection 32.

Referring to FIG. 4A, first screw threads may be formed at an outer circumference of the coupling portion 60, and second screw threads, which are in threaded engagement with the first screw threads, may be formed on an inner surface of the lid 30. Referring to FIG. 4B, the fixing projection 32 may be formed on the inner surface of the lid 30, and the fixing groove may be formed at the outer circumference of the coupling portion 60.

In this case, the automatic injection syringe for plants may further include a sealing member S that is provided between the main body 20 and the lid 30. The sealing member S may prevent the injection solution from leaking out between the lid 30 and the coupling portion 60. Meanwhile, the injection member 41 may be made of a material such as rubber, and seals a gap between an inner wall surface of the main body 20 and the injection unit 40 so that the injection solution stored in the main body 20 cannot flow into the fixing hole 22 of the main body 20.

The fixing member 42, which is coupled to the injection member 41, may be fixed to the main body 20 while being in contact with the bottom surface 21 of the main body 20, and may be fixed in a state in which the hook 43, which is formed at a central portion of the fixing member 42, is inserted into the fixing hole 22 of the bottom surface 21.

The elastic member 24 may be interposed between the bottom surface 21 of the main body 20 and the fixing member 42. In this case, when the hook 43 is pulled out from the fixing hole 22, the injection unit 40 is pushed toward the needle 10 by elastic force of the elastic member 24, whereby the injection solution may be discharged to the outside through the needle 10. Specifically, when the elastic member 24 is disposed between the fixing member 42 and the main body 20, and the releasing unit 50 is moved toward the needle 10 by external force in a state in which the fixing member 42 is fixed to the main body 20, the fixing member 42 and the main body 20 may be released from the fixed state. In addition, in a state in which the fixing member 42 is fixed to the main body 20, the elastic member 24 may be maintained in the compressed state. In this case, the elastic member 24 may be configured to push the fixing member 42 toward the needle 10 when the fixing member 42 is released from the main body 20 so that the fixing member 42 may be moved in the main body 20.

In addition, the automatic injection syringe for plants may further include a wire W that is connected with the injection unit 40. Here, the wire W may be configured to penetrate the releasing unit 50 and come out to the outside of the main body 20.

Specifically, a fastening portion 44 may be formed in the hook 43 of the fixing member 42, and the wire may be connected to the fastening portion 44. The wire W may come out to the outside through the fixing hole 22 of the bottom surface 21. In this case, the wire may be pulled, and then the injection unit 40 may be fixed to the bottom surface 21 again. That is, when the wire is pulled, the fixing member 40 is moved toward the fixing hole 22, and the hook 43 is inserted into and engaged with the fixing hole 22.

The mounting groove 23, into which the elastic member 24 is inserted so that the position of the elastic member 24 is fixed, is formed in the bottom surface 21 of the main body 20. In addition, the fixing hole 22 may be formed to be elongated to the extent of the depth of the mounting groove 23. The releasing unit 50 may be inserted into and installed in the fixing hole 22 from the outside of the main body 20.

For example, the releasing unit 50 may have a hollow cylindrical shape so that the wire may pass through the releasing unit 50. The releasing unit 50 may have an inclined surface that comes into contact with the hook 43. When a user pushes the releasing unit 50 to move the releasing unit 50 in the fixing hole 22, the inclined surface presses the hook 42, such that the hook 42 may be pulled out from the fixing hole 22.

Meanwhile, the automatic injection syringe for plants has a reusable structure. Specifically, when the injection solution is completely injected into the plant, the user may separate the lid 30, and then may fix the injection unit 40 to the fixing hole 22 of the main body 20 again. Alternatively, the user may fix the injection unit 40 to the fixing hole 22 of the main body 20 again by pulling the wire.

A method of injecting a tree with an injection solution by using the automatic injection syringe for plants will be described below.

First, a groove may be formed in the plant body so that the first end of the needle 10 may be inserted into the groove, and the needle 10 may be inserted into a groove of the plant.

As illustrated in FIG. 3A, the user pushes the releasing unit 50 so that the hook 43 of the injection unit 40 may be pulled out from the fixing hole 22. In this case, as the elastic member 24 is released from the compressed state, the elastic member 24 pushes the injection unit 40, whereby the injection solution may be slowly injected into the plant body through the needle 10. As described above, when the injection solution in the main body 20 is completely injected, the automatic injection syringe for plants may be reused.

What is claimed is:

1. An automatic injection syringe for plants, comprising:
   a needle which is inserted into a plant body;
   a lid to which the needle is coupled;
   a main body which is coupled to the lid and accommodates therein an injection solution;
   an injection unit;
   an elastic member which is provided between the injection unit and the main body so as to push the injection unit toward the needle; and
   a releasing unit which releases the injection unit and the main body from the fixed state so that the injection unit is movable in the main body;
   a wire which is connected with the injection unit and penetrates the releasing unit and comes out to the outside of the main body;
   wherein the injection unit includes:
   an injection member which pushes the injection solution in the main body so as to discharge the injection solution toward the needle; and
   a fixing member which is coupled to the injection member and fixed to the main body;
   wherein the elastic member is disposed between the fixing member and the main body, and when the releasing unit is moved toward the needle in a state in which the fixing member is fixed to the main body, the fixing member and the main body are released from the fixed state;
   wherein the elastic member is maintained in a compressed state in a state in which the fixing member is fixed to the main body, and when the fixing member is released from the main body so as to be movable in the main body, the elastic member pushes the fixing member toward the needle;
   wherein a fixing hole is provided in the main body, and a hook, which separably engages with the fixing hole, is provided on the fixing member;
   wherein the releasing unit is disposed in the fixing hole, and when the releasing unit is moved toward the needle, the releasing unit allows the hook to be pulled out from the fixing hole.

2. The automatic injection syringe of claim 1, wherein a mounting groove into which the elastic member is inserted is provided in the main body.

3. The automatic injection syringe of claim 1, wherein the lid includes a blocking film for blocking an outflow of the injection solution in the main body, and the needle is configured to open the blocking film when the needle is coupled to the lid.

4. The automatic injection syringe of claim 1, wherein the main body and the lid are separably coupled to each other.

5. The automatic injection syringe of claim 4, wherein the main body and the lid are in threaded engagement with each other.

6. The automatic injection syringe of claim 4, wherein a fixing groove is formed in one surface of an outer circumferential surface of the main body and an inner circumferential surface of the lid, and a fixing projection, which is coupled to the fixing groove, is formed on the other surface.

7. The automatic injection syringe of claim 4, further comprising:
   a sealing member which is provided between the main body and the lid.

8. The automatic injection syringe of claim 1, wherein one or more projections are provided on the needle.

9. An automatic injection syringe for plants, comprising:
   a main body which stores therein an injection solution;
   a needle which is inserted into a plant body and configured to allow the injection solution in the main body to flow out to the outside;
   an injection unit which is disposed in the main body and defines a storage space for storing the injection solution;
   an elastic member which is configured to move the injection unit inside the main body toward the needle when the elastic member is released from a compressed state; and
   a releasing unit which releases the elastic member from the compressed state a wire which is connected with the injection unit and penetrates the releasing unit and comes out to the outside of the main body;
   wherein the injection unit includes:
   an injection member which pushes the injection solution in the main body so as to discharge the injection solution toward the needle; and
   a fixing member which is coupled to the injection member and fixed to the main body;
   wherein the elastic member is disposed between the fixing member and the main body, and when the releasing unit is moved toward the needle in a state in which the fixing member is fixed to the main body, the fixing member and the main body are released from the fixed state;
   wherein the elastic member is maintained in a compressed state in a state in which the fixing member is fixed to the main body, and when the fixing member is released from the main body so as to be movable in the main body, the elastic member pushes the fixing member toward the needle;
   wherein a fixing hole is provided in the main body, and a hook, which separably engages with the fixing hole, is provided on the fixing member;

wherein the releasing unit is disposed in the fixing hole, and when the releasing unit is moved toward the needle, the releasing unit allows the hook to be pulled out from the fixing hole.

10. An automatic injection syringe for plants, comprising:
a main body which stores therein an injection solution;
an injection unit which defines a storage space for storing the injection solution in the main body;
an elastic member which is configured to move the injection unit inside the main body toward a needle when the elastic member is released from a compressed state; and
a releasing unit which releases the injection unit and the main body from the fixed state so that the injection unit is movable in the main body;
a wire which is connected with the injection unit and penetrates the releasing unit and comes out to the outside of the main body;
wherein the injection unit includes:
an injection member which pushes the injection solution in the main body so as to discharge the injection solution toward the needle; and
a fixing member which is coupled to the injection member and fixed to the main body;
wherein the elastic member is disposed between the fixing member and the main body, and when the releasing unit is moved toward the needle in a state in which the fixing member is fixed to the main body, the fixing member and the main body are released from the fixed state;
wherein the elastic member is maintained in a compressed state in a state in which the fixing member is fixed to the main body, and when the fixing member is released from the main body so as to be movable in the main body, the elastic member pushes the fixing member toward the needle;
wherein a fixing hole is provided in the main body, and a hook, which separably engages with the fixing hole, is provided on the fixing member;
wherein the releasing unit is disposed in the fixing hole, and when the releasing unit is moved toward the needle, the releasing unit allows the hook to be pulled out from the fixing hole.

* * * * *